United States Patent [19]

Fukuhara

[11] 4,322,615
[45] Mar. 30, 1982

[54] FOCUS DETECTING DEVICE WITH SHIELDING

[75] Inventor: Toru Fukuhara, Isehara, Japan

[73] Assignee: Nippon Kogaku K.K., Tokyo, Japan

[21] Appl. No.: 131,493

[22] Filed: Mar. 18, 1980

[30] Foreign Application Priority Data

Apr. 21, 1979 [JP] Japan ............................ 54/52771[U]

[51] Int. Cl.³ .............................................. G01J 1/36
[52] U.S. Cl. ........................................ 250/204; 354/25
[58] Field of Search .......... 250/201, 204, 209, 237 R, 250/216; 354/25; 356/141, 152, 1, 4, 5

[56] References Cited

U.S. PATENT DOCUMENTS

| 3,943,359 | 3/1976 | Matsumoto et al. | 250/201 |
| 4,117,325 | 9/1978 | Holle et al. | 250/204 |
| 4,258,989 | 3/1981 | Tokutomi et al. | 354/25 |

*Primary Examiner*—David C. Nelms

*Attorney, Agent, or Firm*—Fitzpatrick, Cella, Harper & Scinto

[57] ABSTRACT

In a focus detecting device for a camera in which, from an object light passed through a focus plate removably provided on the image formation plane of a phototaking lens, a first image and a second image are formed by a pair of re-imaging optical systems with the in-focus condition of said phototaking lens with respect to an object is detected from the variations in position of said first and second images with respect to a pair of photoelectric converters disposed on or near the focal planes of said re-imaging optical systems, said focus plate being provided with a field lens, there are provided means for shielding, substantially symmetrically with respect to the optic axis of said phototaking lens, part of light beams forming said first and second images formed on said pair of photoelectric converters by said phototaking lens and said pair of re-imaging optical systems, and means for driving said shield means in response to the mounting of said focus plate onto the camera.

7 Claims, 6 Drawing Figures

FOCUS DETECTING DEVICE WITH SHIELDING

BACKGROUND OF THE INVENTION

1. Field of the Invention

This invention relates to a focus detecting device.

2. Description of the Prior Art

A focus detecting device for a single lens reflex camera in which, from a light passed through the focus plate of the single lens reflex camera, a first image and a second image are formed by a pair of re-imaging lenses and the in-focus condition of an objective lens is detected from the variations in position of said first and second images with respect to a pair of image position detecting photoelectric converters disposed on or near the focal planes of said pair of re-imaging lenses is already known, for example, from Japanese Laid-open Patent Application No. 7323/1979.

However, the prior art has the following disadvantages which will hereinafter be described by reference to the accompanying drawings. FIG. 1 is an illustration of the focus detecting device according to the prior art. In FIG. 1, the light beam passed through a phototaking objective lens 1 is converged on the focal plane 2 of a focus plate and then diverged, and part of the light beam passed through the objective lens is converged and imaged on the light-receiving surfaces of a pair of photoelectric elements 4 and 4' by a pair of re-imaging lenses 3 and 3' disposed symmetrically with respect to the optic axis of the objective lens 1. The pair of photoelectric elements 4 and 4' act as image position detecting photoelectric converters and specifically comprise a photoelectric element array. It should be noted here that the distributions of the intensities of illumination on the light-receiving surfaces of the photoelectric elements 4 and 4' for an object must be equal to each other. This is because the focus detection is accomplished by comparing the photoelectric outputs for the same region of an image (light image).

Now, when light beams impinging on the upper light-receiving surface $4a$, the central light-receiving surface $4c$ and the lower light-receiving surface $4b$ of the photoelectric element 4 are conversely projected upon the exit pupil of the object lens 1 from these light-receiving surfaces through the re-imaging lens 3, they become such as shown in FIG. 1. That is, a light beam forming an opening $a_1 a_2 a_3$ mpinges on the upper light-receiving surface $4a$, and a light beam forming an opening $c_1 c_2 c_3$ impinges on the central light-receiving surface $4c$. The openings $a_1 a_2 a_3$ and $c_1 c_2 c_3$ are determined by the effective F-number of the re-imaging lens 3 and are substantially equal in size. However, when converse projection is effected upon the lower light-receiving surface $4b$ in the same manner as upon the former two light-receiving surfaces, the light beam which should impinge on the light-receiving surface $4b$ through the re-imaging lens 3 has an opening $b_1 b_2 b_3$, but when the pupil diameter of the objective lens is small, part of the light beam is missed at the upper end of the objective lens 1 and only a light beam forming an opening $b_1' b_2 b_3$ can impinge on the lower light-receiving surface $4b$. This means that, for example, when an object having a uniform distribution of brightness is measured, the intensity of illumination on the lower light-receiving surface $4b$ is reduced as compared with the intensities of illumination on the upper light-receiving surface $4a$ and the central light-receiving surface $4c$. That is, a distribution of intensity of illumination corresponding to the brightness distribution of the object cannot be obtained on the light-receiving surface of the photoelectric element 4.

This phenomenon equally occurs to the other photoelectric element 4' and the intensity of illumination on the upper light-receiving surface $4'a$ on which the light beam missed at the lower end of the objective lens 1 impinges is reduced below the intensities of illumination on the central light-receiving surface $4'c$ and the lower light-receiving surface $4'b$. Now, the light image formed on the light-receiving surface $4b$ and the light image formed on the light-receiving surface $4'a$ are identical, but the reproducibility of the intensity of illumination of the light image for the object differs from region to region and therefore, the distributions of brightness of the images on the photoelectric elements 4 and 4' do not become identical. Accordingly, the photoelectric outputs of the photoelectric elements 4 and 4' cannot be properly compared and thus, there occurs a focus detection error.

As a technique which overcomes this disadvantage, Japanese Laid-open Patent Application No. 95624/1978 (corresponding German Patent Application P2703290) discloses a technique whereby a field lens is provided near the focus position of the phototaking objective lens. According to this technique, the aforementioned light beams shown in FIG. 1 are displaced toward the optic axis by the field lens. Describing this by reference to FIG. 2, all the light beams $b_1$–$b_3$ converged on the light-receiving surface $4b$ of the photoelectric converter 4 pass through the pupil of the objective lens 1 due to the presence of the field lens $6a$ provided on the focus plate 6. Of course, the light beams converged on the light-receiving surface $4'a$ of the photoelectric converter 4' also pass through the pupil of the objective lens 1. Also, of the light beams which have already passed through the pupil of the objective lens, the light beam converged on the light-receiving surface $4a$ or $4'b$ is displaced toward the optic axis (for example, like $a_1$–$a_3$). The light beam $c_1$–$c_3$ passing through the center of the field lens $6a$ remains unchanged. In this manner, the vignetting at the objective lens 1 can be eliminated, but there is left the following disadvantage.

That is, the power of the field lens must be determined in accordance with the optical characteristic of the objective lens to which the field lens is directed. Accordingly, the curvature of the field lens is determined by the objective lens. On the other hand, the size of the field lens is determined substantially correspondingly to the area, on the focal plane, of an object whose range is to be found, and therefore said curvature cannot be secured in some cases. In FIG. 3, for example, when the field lens $6a$ is shaped integrally with the focus plate 6 and if the diameter of the field lens (namely, the size of the object whose range is to be found) is $d_1$ with the assumption that the curvature of the field range is determined to a certain value, it will be possible to manufacture the field lens, but if the diameter of the field lens is $d_2$, it will be impossible to secure the edge thickness the field lens and to manufacture the field lens. According, in this case, the curvature of the field lens must be made great and the correction as shown in FIG. 2 will become incomplete. That is, as regards a certain type of objective lens, the use of it will still cause a focus detection error to occur.

SUMMARY OF THE INVENTION

It is an object of the present invention to eliminate the above-noted disadvantages and to provide a focus detecting device which is capable of accurate focus detection.

The construction of the present invention for achieving such object is provided with shield means for shielding, substantially symmetrically with respect to the optic axis of an objective lens, part of image forming light beams provided by the objective lens and a pair of re-imaging optical systems for forming a first image and a second image on a pair of photoelectric converters from an object light passed through the objective lens, and means removably provided on the image formation plane of the objective lens for driving said shield means in response to the operation of mounting to a camera a focus plate provided with a field lens.

The invention will become more fully apparent from the following detailed description of an embodiment thereof taken in conjunction with the accompanying drawings.

DESCRIPTION OF THE PREFERRED EMBODIMENTS

Figure 1:
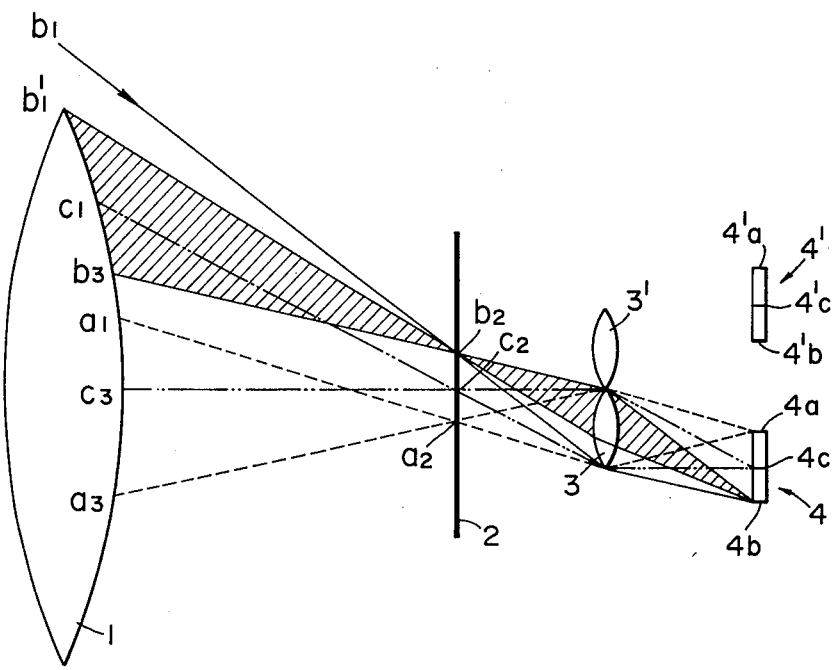
FIGS. 1 and 2 illustrate the focus detecting optical devices according to the prior art.
Figure 2:
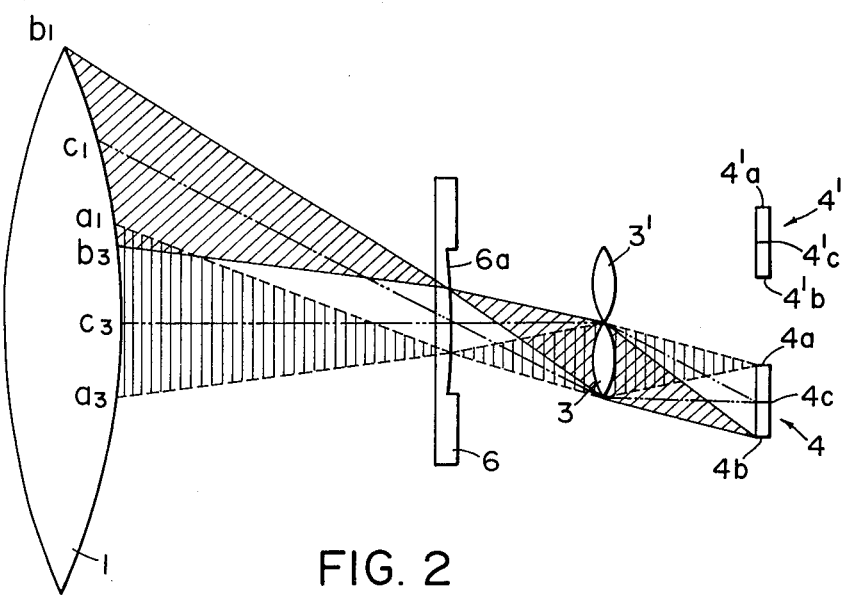
Figure 3:
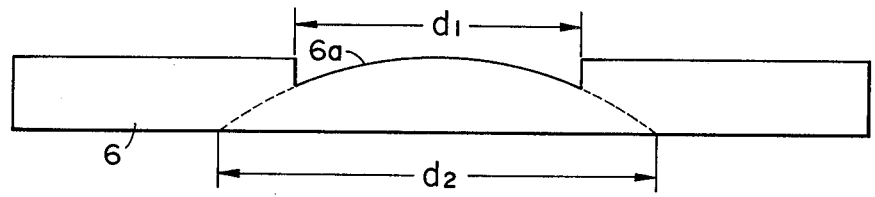
FIG. 3 is an enlarged view of a portion of FIG. 2.
Figure 4:
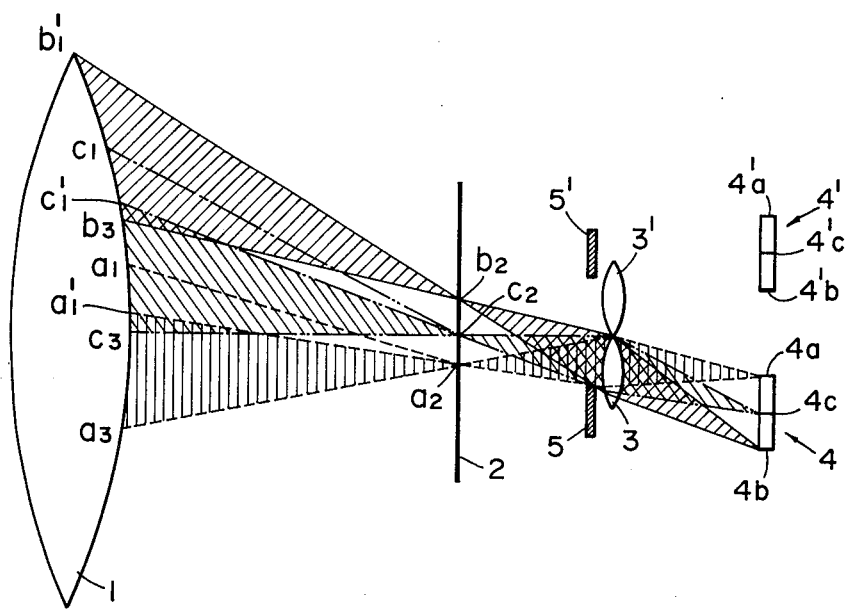
FIG. 4 illustrates the focus detecting optical device according to the present invention.

Reference is first had to FIG. 4 which shows an improvement over the prior art of FIG. 1.

In FIG. 4, shield plates 5 and 5' are inserted from the outer periphery side of re-imaging lenses 3 and 3' toward the optic axis of an objective lens 1. Thereupon, a light beam impinging on the light-receiving surface 4b of a photoelectric element 4 remains to assume an opening $b'_1 b_2 b_3$ and is not varied, whereas part of light beams passing to light-receiving surfaces 4a and 4c is shielded by the shield plate 5 and these light beams assume openings $a'_1 a_2 a_3$ and $c'_1 c_2 c_3$, respectively, and their opening angles are decreased. Likewise, light beams impinging on the light-receiving surfaces 4'b and 4'c of a photoelectric element 4' are also shielded.

Accordingly, if the amounts of projection of the shield plates 5 and 5' into the light-receiving optical path are determined so that, of the light beams passed through the objective lens and impinging on the light-receiving surfaces 4a, 4c and 4'b, 4'c, the light beam shielded by the shield plates 5 and 5' is substantially coincident with the light beam missing the objective lens 1, the intensities of illumination on the light-receiving surfaces of the photoelectric elements 4 and 4' will become uniform. Since the re-imaging lenses 3 and 3' are disposed symmetrically with respect to the optic axis of the objective lens, the shield plates 5 and 5' must substantially symmetrically shield the light beams passed through the objective lens and passing to the light-receiving surfaces 4a, 4c and 4'b, 4'c.

As described above, the intensities of illumination on the light-receiving surfaces of a pair of photoelectric elements can be made equal and thus, accurate focus detection can be accomplished.

The present invention uses this with the correction by the previously described field lens. A specific construction of the present invention will hereinafter be described.

Figure 5:
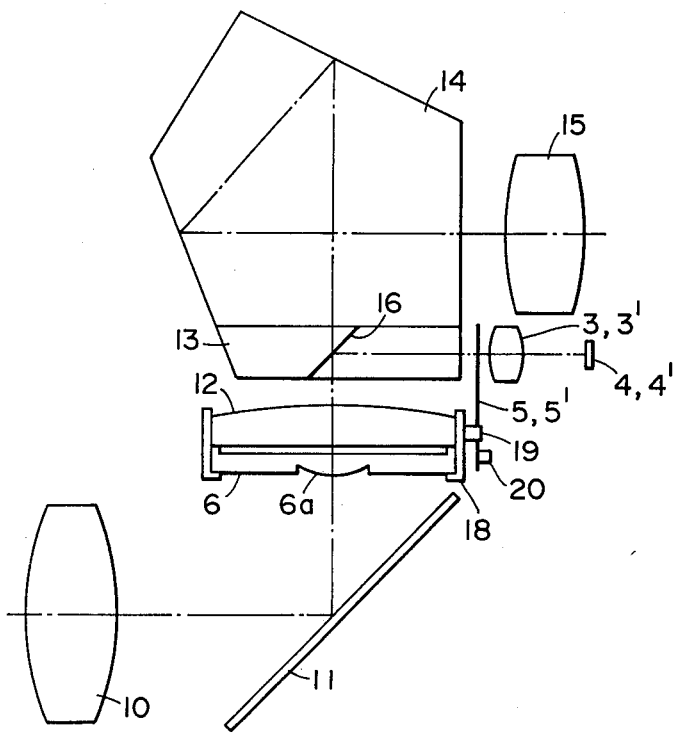
FIG. 5 is a view illustrating the specific construction of the present invention.
Figure 6:
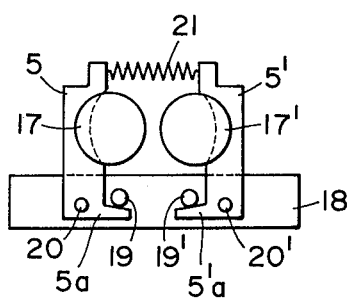
FIG. 6 shows the shield mechanism of FIG. 5.

In FIGS. 5 and 6, the light from the object field passes through an objective lens 10, whereafter it is reflected by a mirror 11 and forms an image on a focus plate 6. This object field image may be viewed through a condenser lens 12, a glass block 13, a pentagonal prism 14 and an eyepiece 15.

On the other hand, part of the light reflected by the mirror 11 is imaged on photoelectric elements 4 and 4' through a field lens 6a, the condenser lens 12, a half-mirror 16 provided within the glass block 13, and re-imaging lenses 3 and 3'.

Now, a support frame 18 supporting the focus plate 6 and the condenser lens 12 (members 6, 12 and 18 together will hereinafter be referred to as the finder screen unit) is removable with respect to a camera and may be interchanged in accordance with the optical characteristic of the interchangeable objective lens. A signal pin 19 is projectedly provided on the support frame 18 supporting the focus plate having a field lens which alone cannot correct with respect to a certain objective lens, as previously described. This signal pin 19 engages and rotates the interlocking ends 5a and 5'a of shield plates 5 and 5' rotatably supported by shafts 20 and 20' provided on the camera body, by the operation of mounting the finder screen unit to the camera. As the result, the shield plates 5 and 5' enter into the focus detecting optical path. FIG. 6 shows a condition in which the mounting has been completed. In the same manner as described in connection with FIG. 4, the adverse effect of the vignetting which could not be corrected by the field lens is eliminated. Of course, at this time, the position of the signal pin 19 is controlled so that the shield plates 5 and 5' effect auxiliary correction for an amount which cannot be corrected by the field lens. In this manner, when various interchangeable objective lenses are used, if the finder screen unit is replaced at the same time and the finder screen units which require auxiliary correction are provided with corresponding signal pins, complete correction may be effected for all the interchangeable lenses. FIG. 6 is a front view showing the arrangement of the support frame 18, signal pins 19, 19', shafts 20, 20', shield plates 5, 5' and lenses 17, 17'. A return compression spring 21 is provided between the shield plates 5 and 5'.

The shield plates 5 and 5' may be replaced by electro-optical elements having a light-intercepting property such as liquid crystal elements or electrochromic elements to obtain the same effect.

Further, the method of shielding the re-imaging lenses is not restricted to shielding them from the outside thereof with respect to the optic axis of the objective lens as described above, but as the means for overcoming the disadvantage in aberrations resulting from the use only one side of each of the re-imaging lenses, it is effective to shield even the portion of the re-imaging lenses which is near the optic axis of the objective lens, symmetrically with respect to the optic axis of the re-imaging lenses, in addition to shielding the re-imaging lenses from the outside thereof.

At this time, the intensities of illumination on the photoelectric elements are only uniformly reduced over the entire light-receiving surfaces and this raises no particular problem in the focus detection.

I claim:

1. A focus detecting device for a camera in which, from an object light passed through a focus plate removably provided on the image formation plane of a phototaking lens, a first image and a second image are formed by a pair of re-imaging optical systems and the in-focus condition of said phototaking lens with respect to an object is detected from the variations in position of said first image and said second image with respect to a pair of photoelectric converters disposed on or near the focal planes of said re-imaging optical systems, said focus plate being provided with a field lens, the improvement comprising:

shield means (5, 5') provided for shielding, substantially symmetrically with respect to the optic axis of said phototaking lens, part of light beams forming said first image and said second image formed on said pair of photoelectric converters by said phototaking lens and said pair of re-imaging optical systems; and means (19, 19', 5a, 5'a) for driving said shield means in response to the mounting of said focus plate onto the camera.

2. The focus detecting device according to claim 1, wherein said driving means includes signal means (19, 19') provided on said focus plate for transmitting the mounting of said focus plate onto the camera to said shield means.

3. The focus detecting device according to claim 1, wherein said focus plate is provided so as to be disposed at a predetermined location of the camera by a support member (18) removable with respect to the camera, and said signal means is provided on said support member.

4. The focus detecting device according to claim 3, wherein said shield means includes shield plates capable of entering into optical paths of the light beams forming said first image and said second image, and said signal means includes a signal member capable of driving said shield plates during said mounting.

5. The focus detecting device according to claim 1, wherein said shield means is provided so as to shield part of the light beams forming said first and second images from the outside of each of said light beams with respect to the optic axis of said phototaking lens.

6. The focus detecting device according to claim 1, wherein said shield means is provided near at least one of the entrance surface and the exit surface of each of said re-imaging optical systems.

7. The focus detecting device according to claim 1, wherein said shield means includes electro-optical elements provided in the optical paths of the light beams forming said first and second images.

* * * * *

UNITED STATES PATENT AND TRADEMARK OFFICE
CERTIFICATE OF CORRECTION

PATENT NO. : 4,322,615
DATED : March 30, 1982
INVENTOR(S) : TORU FUKUHARA

It is certified that error appears in the above—identified patent and that said Letters Patent is hereby corrected as shown below:

IN ABSTRACT:

Line 5, change "with" to --and--.

Column 1, line 47, "mpinges" should be --impinges--.
Column 2, line 59, "range" should be --lens--.

Signed and Sealed this

Twenty-fifth Day of May 1982

[SEAL]

Attest:

Attesting Officer

GERALD J. MOSSINGHOFF

Commissioner of Patents and Trademarks